S. P. BIRDSEY.
ANCHOR.
APPLICATION FILED NOV. 28, 1910.
998,152.
Patented July 18, 1911.
2 SHEETS—SHEET 2.
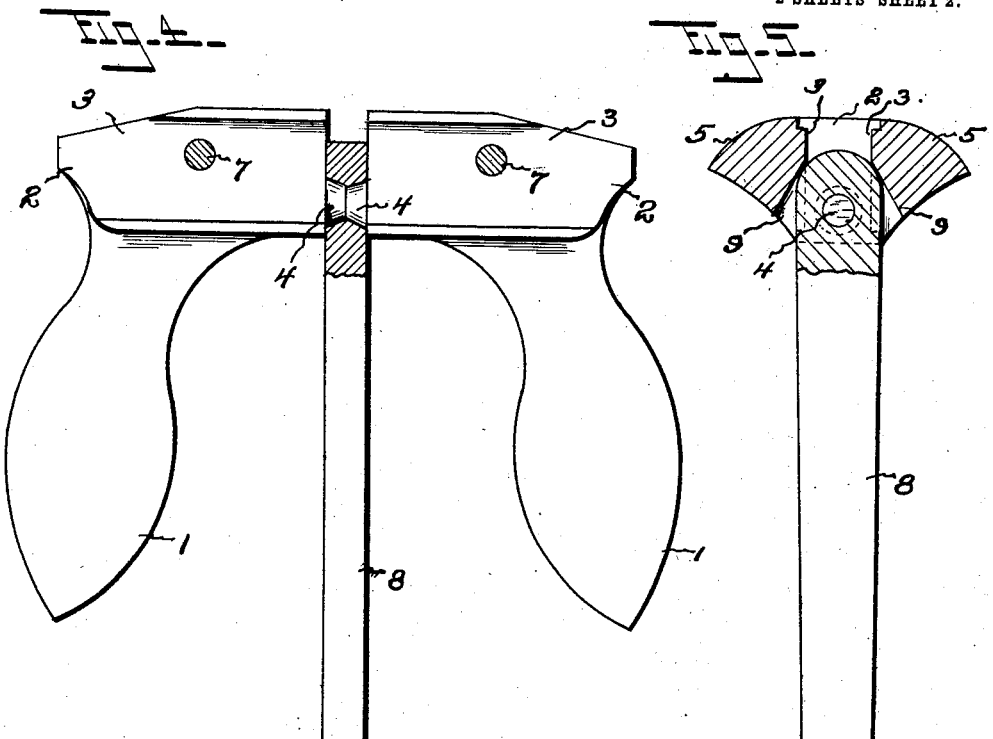

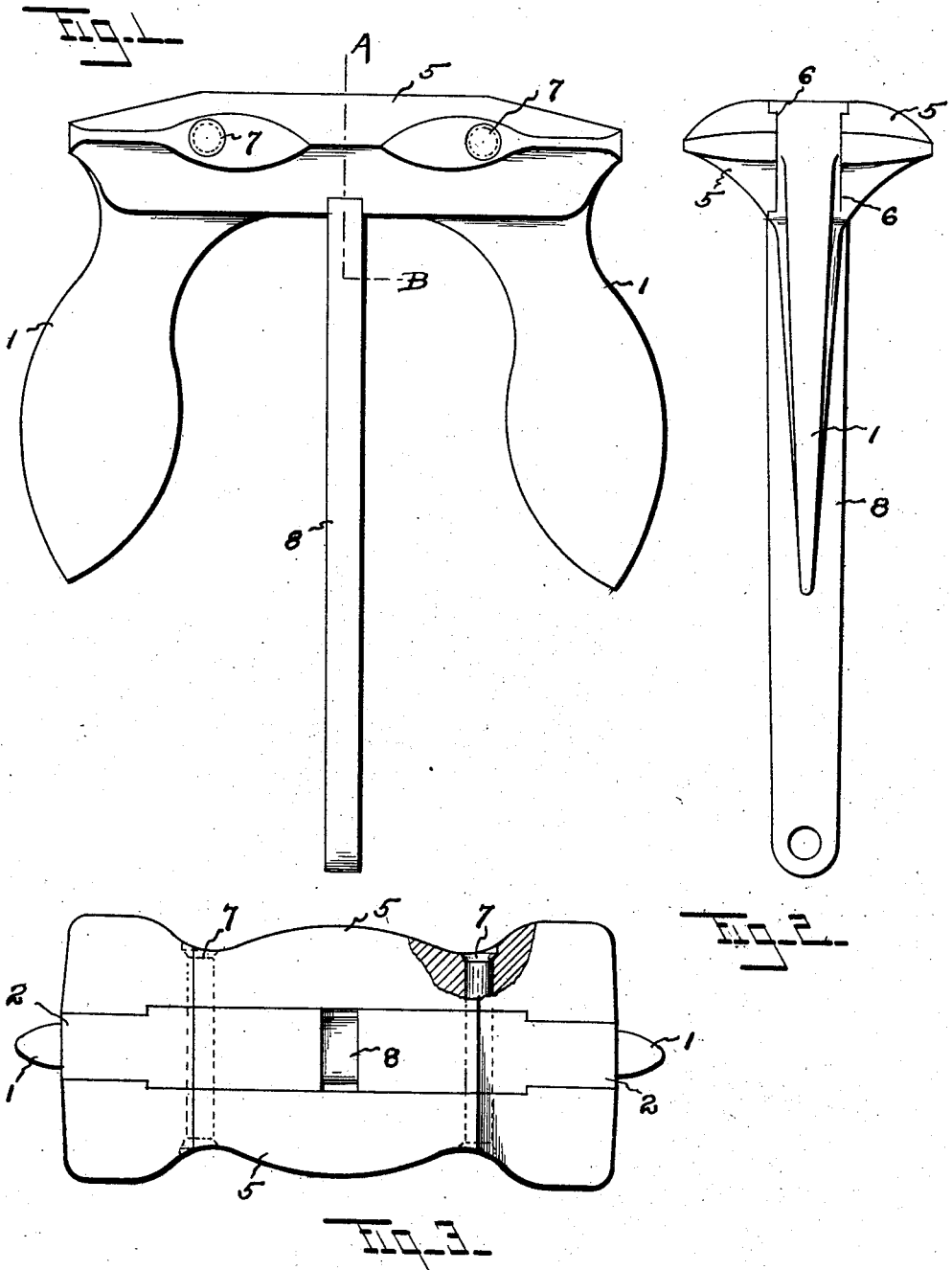

UNITED STATES PATENT OFFICE.

SEELEY P. BIRDSEY, OF MIDDLETOWN, CONNECTICUT, ASSIGNOR TO WILCOX, CRITTENDEN & COMPANY, INCORPORATED, OF MIDDLETOWN, CONNECTICUT, A CORPORATION OF CONNECTICUT.

ANCHOR.

998,152.  Specification of Letters Patent. Patented July 18, 1911.

Application filed November 28, 1910. Serial No. 594,541.

*To all whom it may concern:*

Be it known that I, SEELEY P. BIRDSEY, a citizen of the United States, residing at Middletown, in the county of Middlesex and State of Connecticut, have invented certain new and useful Improvements in Anchors, of which the following is a specification, reference being had therein to the accompanying drawings.

My invention relates to new and useful improvements in anchors, having for its object, among other things, to construct a practically indestructible forged metal anchor, composed of several parts, that may be economically constructed and readily assembled.

To these, and other ends, my invention consists in the anchor, having certain details of construction and combinations of parts, as will be hereinafter described and more particularly pointed out in the claims.

Referring to the drawings, in which like numerals of reference designate like parts in the several figures: Figure 1 is a view of my improved anchor complete; Fig. 2 is a view looking from the right of Fig. 1; Fig. 3 is a plan view, partly in section; Fig. 4 is a detail view of the flukes and the shank assembled therewith; Fig. 5 is a sectional view thereof, upon line A—B of Fig. 1; and Figs. 6 and 7 are views of modified means for connecting the shank with the flukes.

In the practice of my invention I provide two flukes 1—1, that terminate at one end in the head portion 2, having the grooves 3 in each side thereof, with the studs 4 integral therewith upon the inner faces thereof. These flukes are secured together by two crowns 5—5, having the lips 6—6 thereon, which project into the grooves 3 in the fluke heads 2, the crowns and flukes being permanently secured together by the rivets 7, that are headed at both ends, as shown in Fig. 3, either one or both of said heads being formed after the parts are assembled.

The numeral 8 designates the shank, which is pivotally connected with the flukes upon the studs 4, as shown in Figs. 4 and 5, and has a rotary movement thereon between the limiting faces 9 of the crowns 5.

I prefer to use rivets (7), as shown, but within my invention bolts or screws may be substituted if desired. The shank 8, may, if desired, be connected with the head upon a stud 10 that is mounted in the fluke heads 2 by boring a hole therein in place of the studs 4, or the shank may be secured to the head by making the pin 11 integral with the shank, as shown in Fig. 7. These modifications being within the spirit and scope of my invention.

The anchor herein shown and described is constructed of parts that may be economically manufactured without use of such massive and expensive machinery, as is required to construct an anchor composed of but two pieces, that is, the head and shank, and again, the anchors as heretofore ordinarily made, are of cast metal, and frequently break by reason of latent defects therein, due to the casting process, which objection is obviated in my type of anchor, wherein all of the parts may, if desired, be made of forged metal. Again, my method of securing the shank to the flukes is such that it is absolutely impossible for the shank to become loosened or disengaged from the other parts of the anchor.

While I have shown in the drawings only a single bolt for securing each of the flukes to the crown, it is apparent that two or more bolts can be used if desired.

There are other minor changes and alterations that can be made within my invention besides those herein suggested, and I would therefore have it understood that I do not limit myself to the exact construction herein shown and described, but claim all that falls fairly within the spirit and scope of my invention.

Having described my invention, what I claim as new, and desire to secure by Letters Patent, is:—

1. An anchor constructed of fluke members having head portions at substantially a right angle to the flukes; a shank; means for pivotally connecting said shank with said fluke members, the axis of said pivot connection being substantially parallel with said head portion; crown members contacting with said head portions throughout substantially their entire length, and having a tongue and groove connection therewith; and means for securing said fluke and crown members together.

2. In an anchor, the combination with independent fluke members having head portions at substantially a right angle to the flukes; of a shank member pivotally connected therewith and between the inner ends of said head portions; and crown members contacting with said head portions throughout substantially their entire length and having an intermeshing connection therewith; and means for securing all of said parts together.

3. In an anchor, the combination with companion fluke members having head portions at substantially a right angle to the flukes; of a shank pivotally connected therebetween with the axis of said pivotal connection substantially parallel with said head portions; crown members upon either side of, and contacting with said fluke members, said crown members concealing said pivot connection and having limiting faces thereon; and means for securing said fluke and crown members together.

4. In an anchor, the combination with companion fluke members, having studs thereon; of a shank member pivotally mounted on said studs; crown members upon either side of said fluke members; and means for securing said fluke and crown members together.

5. In an anchor, the combination with companion fluke members, having grooved head portions; of a shank member pivotally connected therebetween; crown members upon either side of said fluke members, having parts thereon which project into grooves in said head portions; and means for securing said fluke and crown members together.

6. In an anchor, the combination with companion fluke members having head portions thereon; of a shank member pivotally connected therebetween; crown members upon either side of said fluke members; and means for securing said fluke and crown members together, said securing means passing through said head portions and crown members at substantially a right angle to the pivot connection between said shank and head portions.

In testimony whereof I affix my signature in presence of two witnesses.

SEELEY P. BIRDSEY.

Witnesses:
 THOMAS HOOPS, Jr.,
 H. A. PRATT.

---

Copies of this patent may be obtained for five cents each, by addressing the "Commissioner of Patents, Washington, D. C."